US008977948B1

(12) United States Patent
Balfe et al.

(10) Patent No.: US 8,977,948 B1
(45) Date of Patent: Mar. 10, 2015

(54) SYSTEM, METHOD, AND COMPUTER PROGRAM FOR DETERMINING INFORMATION ASSOCIATED WITH AN EXTRACTED PORTION OF CONTENT

(75) Inventors: Evelyn Balfe, Dun Laoghaire (IE); Sandra Garcia-Esparza, Barcelona (ES); Barry Smyth, Greystones (IE); Oisin Boydell, Delgany (IE); Keith Bradley, Sandyford (IE)

(73) Assignee: Amdocs Software Systems Limited, Dublin (IE)

( * ) Notice: Subject to any disclaimer, the term of this patent is extended or adjusted under 35 U.S.C. 154(b) by 271 days.

(21) Appl. No.: 13/471,342

(22) Filed: May 14, 2012

(51) Int. Cl.
*G06F 17/00* (2006.01)

(52) U.S. Cl.
USPC ....... 715/206; 715/811; 705/14.1; 705/14.49; 705/14.66; 705/26.7

(58) Field of Classification Search
USPC ......... 715/201, 205, 206, 208, 811; 705/14.1, 705/14.49, 14.66, 26.7
See application file for complete search history.

(56) References Cited

U.S. PATENT DOCUMENTS

| 8,359,361 B2* | 1/2013 | Thornton et al. ............. 709/206 |
| 8,607,338 B2* | 12/2013 | Atcha ............................. 726/22 |
| 2009/0327849 A1 | 12/2009 | Kavanagh et al. |
| 2011/0113317 A1* | 5/2011 | Ramaswamy ................. 715/205 |
| 2011/0145250 A1* | 6/2011 | Spaggiari ...................... 707/740 |
| 2012/0233258 A1* | 9/2012 | Vijayaraghavan et al. ... 709/204 |
| 2013/0073335 A1* | 3/2013 | Tang et al. ................... 705/7.29 |
| 2013/0132194 A1* | 5/2013 | Rajaram ..................... 705/14.52 |
| 2013/0218667 A1* | 8/2013 | Mohamed .................. 705/14.45 |

OTHER PUBLICATIONS

Zeltser, L., "How to Use Twitter for Information Mining," ISC Diary, Jan. 21, 2009, retrieved from, http://isc.sans.edu/diary.html?storyid=5728.
Twitturly Blog, 2010, retrieved from http://blog.twitturly.com/.

* cited by examiner

*Primary Examiner* — Stephen Hong
*Assistant Examiner* — Matthew Ludwig
(74) *Attorney, Agent, or Firm* — Zilka-Kotab, PC

(57) ABSTRACT

A system, method, and computer program product are provided for determining information associated with an extracted portion of content. In use, a user is identified. Additionally, content generated by the user is identified. Additionally, a portion of the content is extracted. Further, information associated with the extracted portion of the content is determined. Further still, the determined information is added to a profile of the user. Also, an action is initiated, based on the profile of the user.

11 Claims, 4 Drawing Sheets

SYSTEM, METHOD, AND COMPUTER PROGRAM FOR DETERMINING INFORMATION ASSOCIATED WITH AN EXTRACTED PORTION OF CONTENT

FIELD OF THE INVENTION

The present invention relates to user-generated content, and more particularly to analyzing user-generated content.

BACKGROUND

User-generated content can be a valuable source of information about a user. For example, user-generated content can provide information about a user's preferences, interests, and opinions. Unfortunately, conventional methods for analyzing user-generated content have exhibited various limitations.

For example, current user-generated content analysis may fail to perform a thorough analysis of the user-generated content. There is thus a need for addressing these and/or other issues associated with the prior art.

SUMMARY

A system, method, and computer program product are provided for determining information associated with an extracted portion of content. In use, a user is identified. Additionally, content generated by the user is identified. Additionally, a portion of the content is extracted. Further, information associated with the extracted portion of the content is determined. Further still, the determined information is added to a profile of the user. Also, an action is initiated, based on the profile of the user.

DETAILED DESCRIPTION

Figure 1:
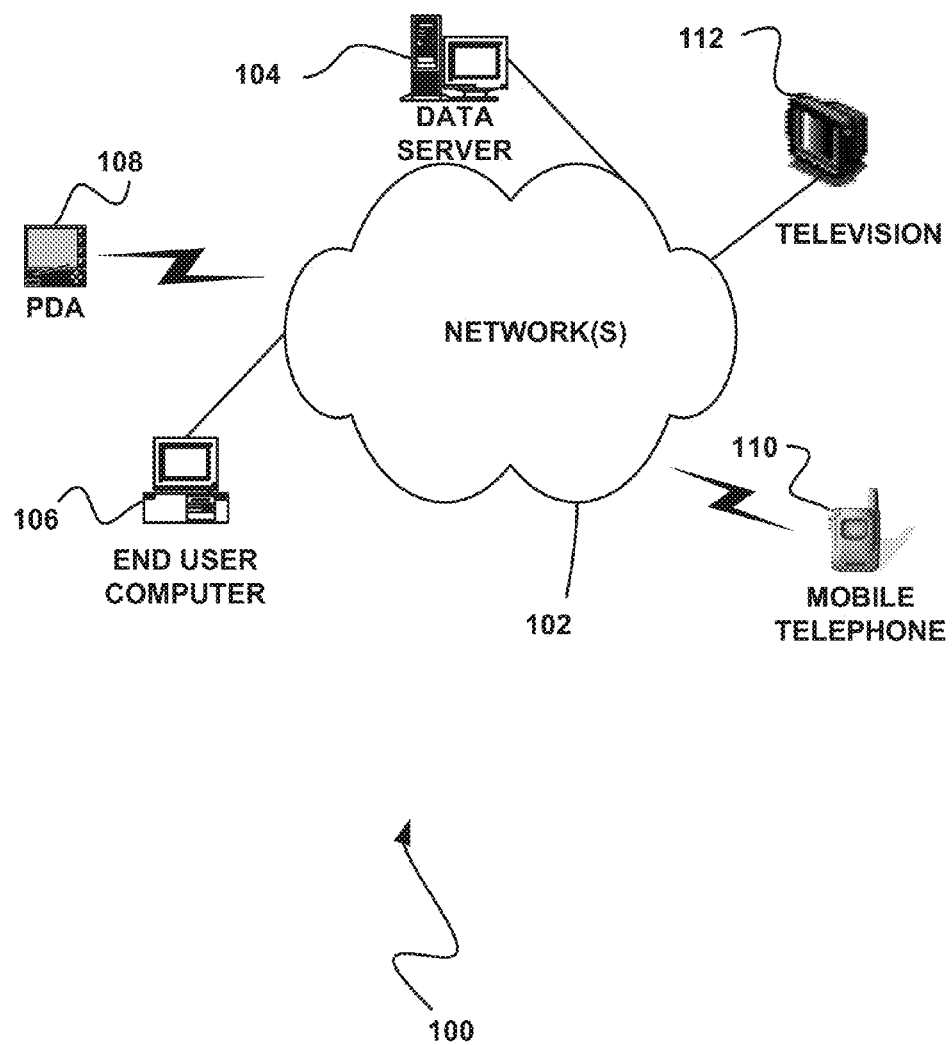
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, a tablet computer, etc.

Figure 2:
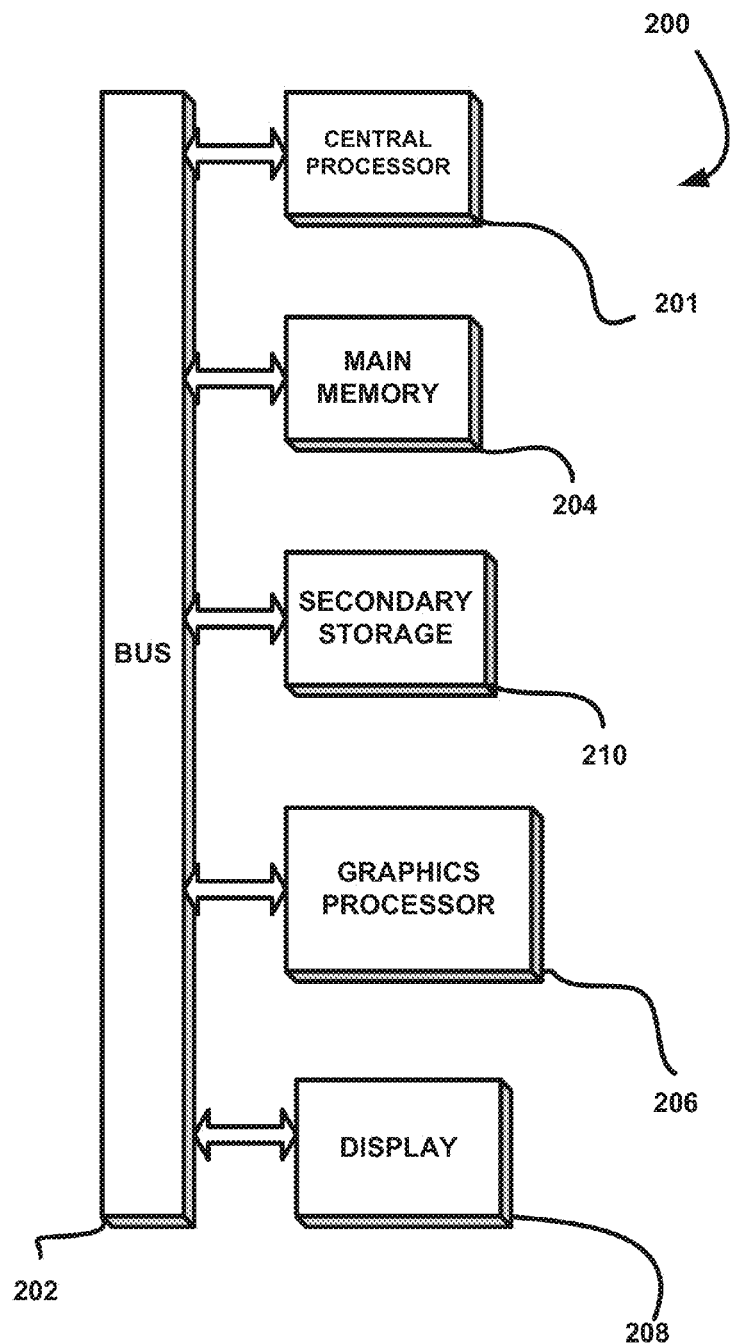
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
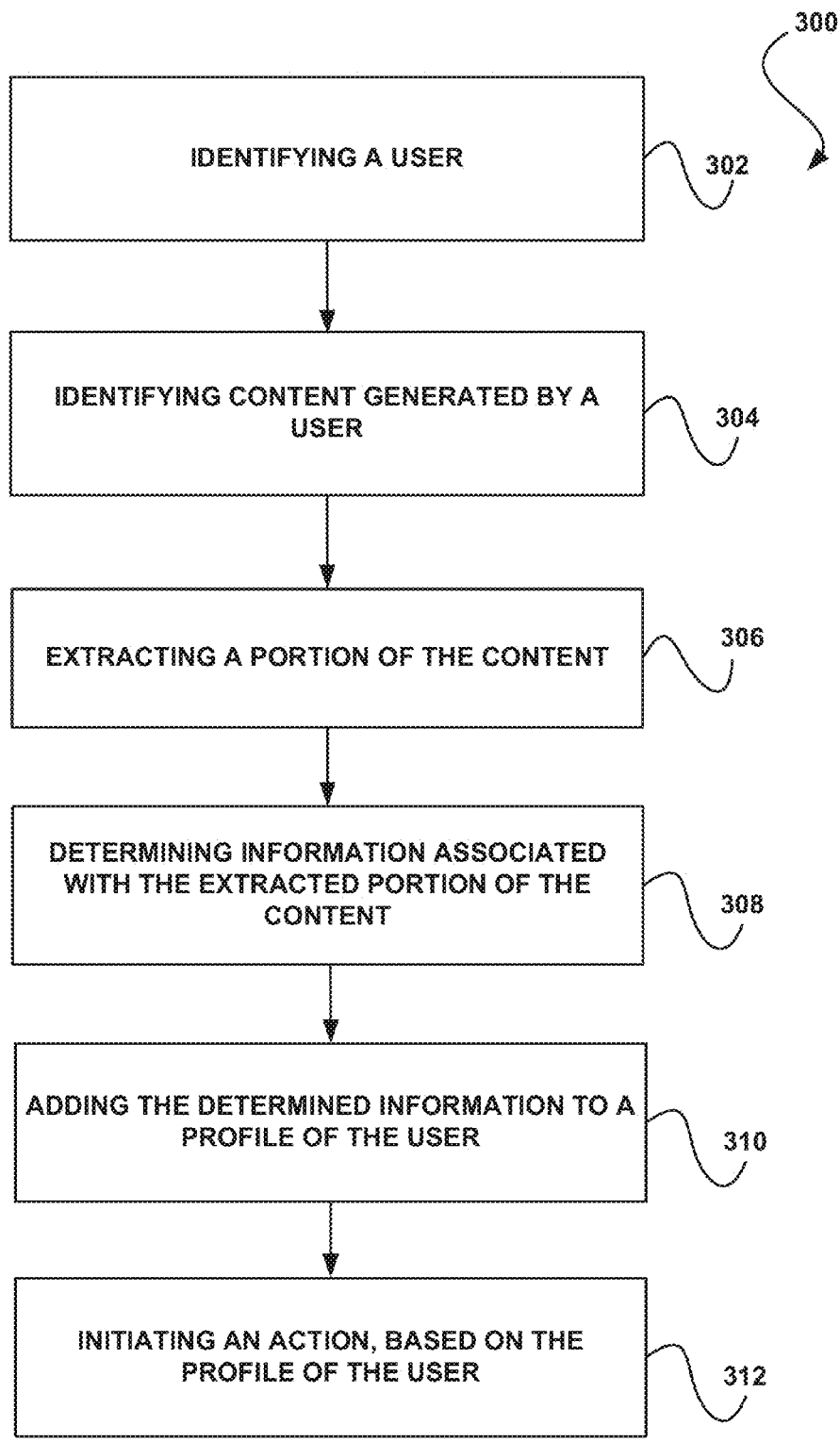
FIG. 3 illustrates a method for determining information associated with an extracted portion of content, in accordance with one embodiment.

FIG. 3 illustrates a method 300 for determining information associated with an extracted portion of content, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a user is identified. In one embodiment, the user may include a user of a computing device. For example, the user may include an individual connected to the Internet via a computing device (e.g., a cellular phone, a desktop computer, a tablet computer, a laptop computer, etc.). In another embodiment, the user may be identified by obtaining an identifier of a user. For example, an entity (e.g., a business, corporation, group, etc.) may identify and store identifiers of users who are associated with the entity within a social media or social networking web page (e.g., users who follow the entity or are otherwise connected to the entity within the social media or social networking web page, etc.).

Also, as shown in operation 304, content generated by a user is identified. In one embodiment, the content generated by the user may include micro-blog content. For example, the content may include short message content entered by the user using a micro-blog (e.g., information entered through a micro-blog interface, etc.).

Additionally, in one embodiment, the content generated by the user may include one or more of social networking and social media content. For example, the content may include content entered by the user using a social network web site. In another embodiment, the content generated by the user may include blog content. For example, the content may include content entered by the user using a web log. In yet another embodiment, the content generated by the user may include web browsing content. For example, the content may include content entered by the user using a web browser.

Further, in one embodiment, the content generated by the user may include one or more links to one or more web pages. For example, the content may include one or more uniform resource locators (URLs), one or more hyperlinks, etc. In another embodiment, the content generated by the user may include text. For example, the content may include one or more words, sentences, posts, etc. In yet another embodiment, the content generated by the user may include one or more images, one or more videos, one or more audio files, etc. In still another example, the content generated by the user may have a particular format. For example, the content may be generated by the user using hypertext markup language (HTML), JavaScript®, etc.

Further still, in one embodiment, the content generated by the user may be identified by tracking the content as it is generated by the user. For example, an online entity may follow multiple users on a social media web site and may track and record the content generated by those users. In another embodiment, the content generated by the user may be identified through software installed on a computing device of the user. For example, one or more applications installed on the user's computing device may identify the content generated by the user.

Also, as shown in operation 306, a portion of the content is extracted. In one embodiment, the portion of the content may include one or more elements of a predetermined type. For example, the portion of the content may include all links to one or more web pages within the content (e.g., all hyperlinks within the content, all URLs within the content, etc.). In another embodiment, extracting the portion of the content may include parsing the content. For example, extracting the portion of the content may include parsing the content, identifying the portion of the content that is to be extracted, and extracting the content. In addition, in one embodiment, extracting the portion of the content may include copying the portion of the content. In another embodiment, extracting the portion of the content may include storing the copied content in a database.

Furthermore, as shown in operation 308, information associated with the extracted portion of the content is determined. In one embodiment, the information associated with the extracted portion of the content may include web site information of one or more web sites referenced by the extracted portion of the content. For example, the extracted portion of the content may include one or more URLs, and the information associated with the extracted portion of the content may include information describing the web pages located at the one or more URLs.

Further still, in one embodiment, determining the information associated with the extracted portion of the content may include locating and identifying one or more web sites located at a location determined by the extracted portion of the content. For example, determining the information associated with the extracted portion of the content may include accessing one or more web pages located at one or more URLs found within the content.

Also, in one embodiment, determining the information associated with the extracted portion of the content may include analyzing the one or more web sites located at the one or more URLs found within the content. For example, determining the information associated with the extracted portion of the content may include parsing the one or more web sites, analyzing content (e.g., images, text, audio, hyperlinks, etc.) found within the one or more web sites, etc.

Additionally, in one embodiment, the information associated with the extracted portion of the content may include one or more categories, and determining the information may include categorizing each of the one or more web sites located at the one or more URLs found within the content. For example, determining the information associated with the extracted portion of the content may include determining one or more categories and assigning one or more categories to each of the one or more web sites, assigning one or more topics to each of the one or more web sites, etc.

In another embodiment, the one or more categories assigned to each of the one or more web sites may describe one or more elements found within each of the one or more web sites. For example, the one or more categories may describe the subject matter covered by each of the one or more web sites, summarize the focus of each of the one or more web sites, etc. In yet another embodiment, the information associated with the extracted portion of the content may include one or more topics within the one or more categories.

Further, in one embodiment, the information associated with the extracted portion of the content may include one or more weights, and determining the information may include weighting one or more elements of the categorizing. For example, determining the information associated with the extracted portion of the content may include assigning a weight to each of the one or more categories determined for and assigned to each of the one or more web sites. In another embodiment, the weight of each of the one or more categories may be associated with a relevance of that category within the web page, an importance of that category within the web page, a popularity of that category within the web page, a degree of interest in the category within the web page, etc.

In yet another embodiment, the information associated with the extracted portion of the content may be weighted based on activity associated with the extracted portion of the content. For example, if the extracted portion of the content is shared, distributed, or otherwise repeated via one or more venues (e.g., social media sites, micro-blogs, social networking sites, etc.) by additional users, a weight associated with the information associated with the extracted portion of the content may be increased.

Further still, in one embodiment, the information associated with the extracted portion of the content may include one or more sentiment scores, and determining the information may include associating a sentiment with each of the one or more categories determined for and assigned to each of the one or more web sites. For example, a sentiment score may be assigned to each of the one or more categories, based on a sentiment determined for each category.

In another embodiment, the sentiment score may be positive or negative. For example, a positive sentiment score may indicate a positive attitude toward the associated category within the web page, and a negative sentiment score may indicate a negative attitude toward the associated category within the web page. In yet another embodiment, the sentiment score may be based on a percentage scale (e.g., a scale from one to one hundred percent, etc.).

Also, as shown in operation 310, the determined information is added to a profile of the user. In one embodiment, the profile of the user may be stored in a database (e.g., a local database within a computing device of a user, a remote database separate from a computing device of the user, etc.), and adding the determined information to the profile of the user may include storing the determined information in the database and associating the determined information with the user's profile within the database. In another embodiment, the profile of the user may include one or more user identifiers. For example, the profile of the user may include a name of the user, contact information of the user (e.g., the user's electronic mail address, physical address, phone number, etc.), a unique identifier for the user (e.g., a user name, user number, social media identifier, etc.), etc.

Additionally, as shown in operation 312, an action is initiated, based on the profile of the user. In one embodiment, initiating the action may include identifying the user as a match for a category or topic. For example, a plurality of profiles including the profile of the user may be compared to one or more criteria associated with a predefined category (e.g., fans of a particular musical artist, etc.), and profiles matching the one or more criteria may be selected as being associated with the predefined category.

In another embodiment, initiating the action may include sending content associated with the category or topic to the user as a result of the user being a match for the category or topic. For example, the content may include discount coupons, promotional giveaways, targeted advertising, etc. For instance, if it is determined that the user's profile is associated with a predefined category of a particular musical artist, content including complimentary tickets to a performance of the particular musical artist, discount coupons for an album of the particular musical artist, or an advertisement for an upcoming release of the particular musical artist may be sent to the user.

In yet another embodiment, the determined information may be used to determine the user's interest in one or more topics. In another embodiment, the determined information for the user may be compared against determined information for other users. In yet another embodiment, the user may be ranked based on the determined information. For example, users may be ranked based on weights assigned to categories associated with each user, where the users may be ranked for individual categories. In this way, a weighted topical representation of the user's interests may be determined from the extracted portions of the content generated by the user, where such representation may be more accurate that simple keyword analysis of the content generated by the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
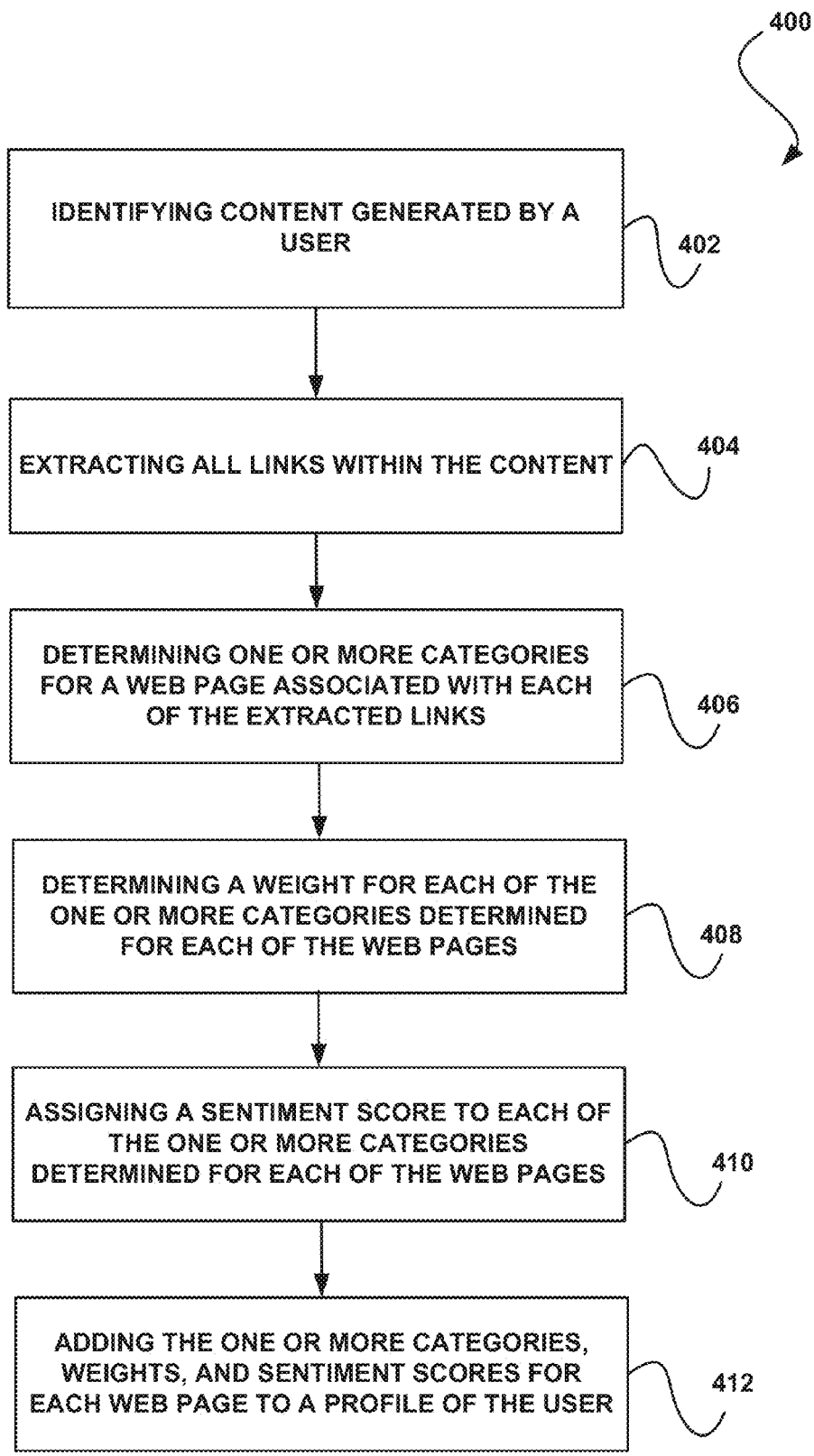
FIG. 4 illustrates a method for analyzing user generated content, in accordance with one embodiment.

FIG. 4 illustrates a method 400 for analyzing user generated content, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, content generated by a user is identified. In one embodiment, the content may include a user's post to a micro-blogging site, a user's post to a blog, a user's update to a social networking/social media site, a user's current or past web browsing (e.g., a user's mobile or non-mobile web log, personal digital assistant (PDA) browsing log, television web browsing log, etc.), etc. In one embodiment, the content may include behavioral data (e.g., location data associated with the user, location history data associated with a user's past physical locations while generating content, etc). In yet another embodiment, the user may be a member of a group. For example, the user may be one of a group of users that follows a particular product brand. Additionally, as shown in operation 404, all links within the content are extracted. In one embodiment, the links may include one or more links to external web sites (e.g., web sites other than the web site where the link was posted). In another embodiment, the links may include one or more hyperlinks.

Further, as shown in operation 406, one or more categories are determined for a web page associated with each of the extracted links. In one embodiment, the one or more categories may describe content provided by the web page associated with each of the extracted links, where each web page is a destination of an extracted link. For example, the one or more categories that are determined for an extracted link may include categories describing content provided by the web page that is presented to a user when the user selects (e.g., clicks on, etc.) the link.

In another embodiment, the one or more categories may be determined by analyzing the web page presented to the user when the user selects the link. For example, one or more elements of the web page (e.g., text of the web page, images of the web page, audio of the web page, video of the web page, web page HTML, etc.) may be parsed and analyzed in order to determine the one or more categories for the extracted link that directs the user to that web page. Further still, in one embodiment, a set of categories may be determined for one or more of the extracted links. In another embodiment, one or more parent categories and one or more child categories may be determined for one or more of the extracted links. In yet another embodiment, the one or more categories may be determined by a categorization tool.

Also, as shown in operation 408, a weight may be determined for each of the one or more categories determined for each of the web pages. In one embodiment, the weight may indicate an importance of the category of the content provided by the web page. In another embodiment, the weights of all categories for a web page may add up to a certain amount. For example, the sum of all weights for all categories of a web page may be one hundred, such that the weight for each category is a percentage of the total amount. In yet another embodiment, one or more weights may be determined manually. For example, one or more weights may be determined by the user, by an individual other than the user (e.g., an administrator), etc.

In addition, in one embodiment, one or more topics may be identified within a category. For example, a topic labeled "soccer" may be identified within the identified category of "sports." In another example, another topic labeled "teams" and a topic labeled "players" may be identified within the identified category of "soccer" and "sports." In another embodiment, each of the topics within a category may be weighted. For example, the "soccer" topic may be given a 20% weight if it is determined that 20% the web page material concerned with soccer. In yet another embodiment, the most popular categories and/or the most popular topics may be identified for each web page.

Furthermore, as shown in operation 410, a sentiment score is assigned to each of the one or more categories determined for each of the web pages. In one embodiment, the sentiment score may indicate a positive or negative attitude towards the category to which the sentiment score is assigned. For example, a web page may be a fan page associated with a particular category, and the sentiment score associated with the category of the web page may therefore be positive. In another example, the web page may be an issue and/or problem page associated with a particular category, and the sentiment score associated with the category of the web page may therefore be negative. In another embodiment, the sentiment score may be determined by analyzing the web page presented to the user when the user selects the link. In yet another embodiment, the sentiment score may be determined by a sentiment analyzer.

Further still, as shown in operation 412, the one or more categories, weights, and sentiment scores for each web page are added to a profile of the user. In one embodiment, the profile of the user may be located in a database, and the one or more categories, weights, and sentiment scores for each web page may be added to the database and linked to the profile of the user. In another embodiment, the database may have separate sections for each of the one or more categories, weights, and sentiment scores for each web page.

In this way, the above data that is added to the profile of the user may be used to rank one or more users. For example, user profiles may be used to identify users who have the highest interest in a particular category (e.g., a "sports" category, etc.), the highest interest in one or more topics within that category (e.g., a particular sport, a particular team within the sport, one or more specific players within the sport), etc. In another embodiment, the profile of the user may be used to determine a sentiment of the user with respect to one or more categories, topics, etc. In yet another embodiment, the profile of the user may be used to target advertising to the user (e.g., by displaying advertising to the user that may interest the user based on the user's profile, etc.). For example, the user's profile may be used in order to target the user with one or more of offers, tickets, advertisements, promotions, products, recommendations, etc. that match one or more of the determined categories and topics within the profile of the user.

In another example, a service provider or brand may have a new product to trial, and may desire to send a notification to a list of followers of the service within a micro-blogging environment who have expressed a lot of interest with the product in the past. Additionally, the list of users that may be provided to the service provider or brand may include users that provide links to the service provider's products in posts utilizing the micro-blogging environment, and not just users that specifically write about keywords associated with the service provider or brand in their posts.

Further, the weighting associated with the categories and topics in each user's profile may be used to measure a degree of interest in a particular topic or category, and two or more user's interests in the service provider may therefore be compared, ranked, and provided to the service provider or brand. Further still, user interest in a particular product, good, or service may be inferred based on the content of the links contained within the content generated by the user.

For example, preference and interest data may be extracted from user posts by leveraging categorical and topical information about pages and URLs that the user shares through their postings. Since users may share URLs that are of interest to them, the content of these URLs (e.g., the web pages pointed to by the URLs) may provide a rich source of preference and interest data and may provide more information than a simple text analysis of the postings. Also, the URLs posted by a user may be classified using automatic classification techniques to determine a set of one or more categories and topics relating to the content being shared by the user.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable storage medium, comprising:
   computer code for extracting one or more uniform resource locators (URLs) from user content generated by a user;
   computer code for analyzing web content found within each of the one or more web pages located at the one or more URLs to determine one or more categories associated with each of the one or more web page;
   computer code for assigning the determined categories to each of the one or more web pages;
   computer code for assigning a weight to one or more of the categories associated with each of the one or more web pages, where the weight is based on a popularity of the one or more categories within each of the one or more web pages;
   computer code for assigning a sentiment score each of the one or more categories associated with each of the one or more web pages, where the sentiment score indicates a positive or negative attitude toward each of the one or more categories within each of the associated one or more web pages;
   computer code for adding the one or more determined categories and the assigned one or more weights and sentiment scores to a profile of the user;
   computer code for matching the profile of the user to a predefined topic; and
   computer code for sending content associated with the predefined topic to the user, based on the matching.

2. The computer program of claim 1, wherein the content generated by the user includes micro-blog content.

3. The computer program of claim 1, wherein the content generated by the user includes one or more of social networking and social media content.

4. The computer program of claim 1, wherein the content generated by the user includes web browsing content.

5. The computer program of claim 1, further comprising determining one or more topics within the one or more categories.

6. The computer program of claim 1, wherein the one or more categories assigned to each of the one or more web sites describe one or more elements found within each of the one or more web sites.

7. The computer program of claim 1, wherein a positive sentiment score indicates the positive attitude toward the associated category within the web page, and a negative sentiment score indicates the negative attitude toward the associated category within the web page.

8. The computer program of claim 1, wherein adding the one or more determined categories and the assigned one or more weights and sentiment scores to the profile of the user includes storing the one or more determined categories and the assigned one or more weights and sentiment scores in a database and associating the one or more determined categories and the assigned one or more weights and sentiment scores with the user's profile within the database.

9. A method, comprising:
   extracting one or more uniform resource locators (URLs) from user content generated by a user;
   analyzing web content found within each of the one or more web pages located at the one or more URLs to determine one or more categories associated with each of the one or more web pages;
   assigning the determined categories to each of the one or more web pages;
   assigning a weight to one or more of the categories associated with each of the one or more web pages, where the weight is based on a popularity of the one or more categories within each of the one or more web pages;
   assigning a sentiment score each of the one or more categories associated with each of the one or more web pages, where the sentiment score indicates a positive or negative attitude toward each of the one or more categories within each of the associated one or more web pages;
   adding the one or more determined categories and the assigned one or more weights and sentiment scores to a profile of the user;

matching the profile of the user to a predefined topic; and
sending content associated with the predefined topic to the user, based on the matching.

10. A system, comprising:

a processor for:

extracting one or more uniform resource locators (URLs) from user content generated by a user;

analyzing web content found within each of the one or more web pages located at the one or more URLs to determine one or more categories associated with each of the one or more web pages;

assigning the determined categories to each of the one or more web pages;

assigning a weight to one or more of the categories associated with each of the one or more web pages, where the weight is based on a popularity of the one or more categories within each of the one or more web pages;

assigning a sentiment score each of the one or more categories associated with each of the one or more web pages, where the sentiment score indicates a positive or negative attitude toward each of the one or more categories within each of the associated one or more web pages;

adding the one or more determined categories and the assigned one or more weights and sentiment scores to a profile of the user;

matching the profile of the user to a predefined topic; and sending content associated with the predefined topic to the user, based on the matching.

11. The system of claim 10, wherein the processor is coupled to memory via a bus.

\* \* \* \* \*

UNITED STATES PATENT AND TRADEMARK OFFICE
CERTIFICATE OF CORRECTION

PATENT NO. : 8,977,948 B1
APPLICATION NO. : 13/471342
DATED : March 10, 2015
INVENTOR(S) : Evelyn Balfe et al.

Page 1 of 1

It is certified that error appears in the above-identified patent and that said Letters Patent is hereby corrected as shown below:

In the Claims:
At column 7, claim number 1, line number 65; please replace "page" with --pages--.

Signed and Sealed this
Twelfth Day of April, 2016

Michelle K. Lee
*Director of the United States Patent and Trademark Office*